US008416158B2

(12) United States Patent
Seto

(10) Patent No.: US 8,416,158 B2

(45) Date of Patent: Apr. 9, 2013

(54) DISPLAY APPARATUS

(75) Inventor: Yasuhiro Seto, Kanagawa-ken (JP)

(73) Assignee: Fujifilm Corporation (JP)

( * ) Notice: Subject to any disclaimer, the term of this patent is extended or adjusted under 35 U.S.C. 154(b) by 771 days.

(21) Appl. No.: 12/499,593

(22) Filed: Jul. 8, 2009

(65) Prior Publication Data

US 2010/0013746 A1 Jan. 21, 2010

(30) Foreign Application Priority Data

Jul. 15, 2008 (JP) ................................ 2008-183443

(51) Int. Cl.
*G09G 3/30* (2006.01)
*G09G 5/00* (2006.01)
*G06F 3/038* (2006.01)

(52) U.S. Cl. ........................................ 345/76; 345/204

(58) Field of Classification Search ........................ None
See application file for complete search history.

(56) References Cited

U.S. PATENT DOCUMENTS

| | | | | |
|---|---|---|---|---|
| 5,530,672 | A * | 6/1996 | Konishi | 365/189.11 |
| 5,684,365 | A | 11/1997 | Tang et al. | |
| 7,358,941 | B2 | 4/2008 | Ono et al. | |
| 7,880,699 | B2 * | 2/2011 | Cheng et al. | 345/82 |
| 2004/0119669 | A1 * | 6/2004 | Ishizuka et al. | 345/83 |
| 2005/0002252 | A1 * | 1/2005 | Takano et al. | 365/210 |
| 2005/0104625 | A1 * | 5/2005 | Park | 326/86 |
| 2005/0206590 | A1 * | 9/2005 | Sasaki et al. | 345/76 |
| 2006/0083052 | A1 * | 4/2006 | Kang et al. | 365/154 |
| 2006/0091794 | A1 * | 5/2006 | Agostinelli et al. | 313/506 |
| 2006/0187153 | A1 * | 8/2006 | Nathan et al. | 345/76 |
| 2006/0231882 | A1 * | 10/2006 | Kim et al. | 257/310 |
| 2007/0072439 | A1 * | 3/2007 | Akimoto et al. | 438/795 |
| 2007/0194770 | A1 * | 8/2007 | Kalyanaraman | 323/313 |
| 2007/0222482 | A1 * | 9/2007 | Thorp et al. | 327/93 |
| 2007/0247398 | A1 * | 10/2007 | Nathan et al. | 345/82 |
| 2008/0001545 | A1 * | 1/2008 | Uchino et al. | 315/175 |
| 2008/0007547 | A1 * | 1/2008 | Hasumi et al. | 345/211 |
| 2008/0042948 | A1 * | 2/2008 | Yamashita et al. | 345/82 |
| 2008/0067588 | A1 * | 3/2008 | Williams et al. | 257/343 |
| 2008/0105905 | A1 * | 5/2008 | Kang et al. | 257/225 |

FOREIGN PATENT DOCUMENTS

| | | | |
|---|---|---|---|
| JP | 2003-255856 | A | 9/2003 |
| JP | 2004-118132 | A | 4/2004 |
| JP | 2006-227237 | A | 8/2006 |
| JP | 2008-051990 | A | 3/2008 |

OTHER PUBLICATIONS

Japanese Office Action "Notification of Grounds for Rejection" dated Apr. 24, 2012; Japanese Patent Application No. 2008-183443 with a partial translation.

* cited by examiner

*Primary Examiner* — Amare Mengistu
*Assistant Examiner* — Antonio Xavier
(74) *Attorney, Agent, or Firm* — Studebaker & Brackett PC; Donald R. Studebaker

(57) ABSTRACT

In a display apparatus that includes an active matrix substrate on which multiple pixel circuits are disposed, each having a light emitting element, a drive transistor, a capacitor element connected between a gate terminal and the source terminal of the drive transistor, and a selection transistor, and a threshold voltage of the drive transistor is corrected by causing the capacitor element to hold the threshold voltage of the drive transistor, reverse bias voltages, each having a magnitude corresponding to a preset initial threshold voltage and a drive voltage of the drive transistor, the magnitude of the drive voltage being dependent on the amount of emission of the light emitting element, are supplied to the gate terminal of the drive transistor.

14 Claims, 14 Drawing Sheets

DISPLAY APPARATUS

BACKGROUND OF THE INVENTION

1. Field of the Invention

The present invention relates to a display apparatus having light emitting elements driven by an active matrix method.

2. Description of the Related Art

Display devices using light emitting elements, such as organic EL elements, for use in various applications, including televisions, cell phone displays, and the like, have been proposed.

Generally, organic EL elements are current driven light emitting elements and, unlike a liquid crystal display, require, as minimum, selection transistors for selecting pixel circuits, holding capacitors for holding charges according to an image to be displayed, and drive transistors for driving the organic EL elements as the drive circuit as described, for example, U.S. Pat. No. 5,684,365 (Patent Document 1).

Heretofore, thin film transistors of low-temperature polysilicon or amorphous silicon have been used in pixel circuits of active matrix organic EL display devices.

The low-temperature polysilicon thin film transistor may provide high mobility and stability of threshold voltage, but has a problem that the mobility is not uniform. The amorphous silicon thin film transistor may provide uniform mobility, but has a problem that the mobility is low and threshold voltage varies with time.

The non-uniform mobility and instable threshold voltage appear as irregularities in the displayed image. Consequently, for example, Japanese Unexamined Patent Publication No. 2003-255856 (Patent Document 2) proposes a display device in which a compensation circuit of diode connection is provided in the pixel circuit.

The provision of the compensation circuit described in Patent Document 2, however, causes the pixel circuit to become complicated, resulting in increased cost due to low yield rate and low aperture ratio.

As such, for example, U.S. Patent Application Publication No. 20050206590 (Patent Document 3) proposes a method for correcting the threshold voltage of the drive transistor by charging a parasitic capacitance of the organic EL element and reducing the number of transistors used in the pixel circuit.

In the pixel circuit described in Patent Document 3, it is necessary to use an n-type thin film transistor as the drive transistor, and the use of an amorphous silicon thin film transistor is envisaged as the n-type thin film transistor.

The amorphous silicon thin film transistor, however, poses a problem that the threshold voltage is shifted by gate voltage stress.

Further, the pixel circuit described in Patent Document 3 has a configuration in which the anode terminal of the organic EL element is connected to the source terminal of the drive transistor, and a capacitor element for detecting the threshold voltage is provided between the gate and source of the drive transistor. In this configuration, the threshold voltage of the drive transistor is held by the capacitor element by applying a predetermined fixed voltage to the gate terminal of the drive transistor to apply a detection current and charging the parasitic capacitance of the organic EL element by the detection current.

Therefore, in order to charge the parasitic capacitance without causing the organic EL element to emit light, it is necessary to set the source terminal voltage Vs of the drive transistor (anode terminal voltage of the organic EL element) lower than emission threshold voltage Vf0 of the organic EL element, as illustrated in FIG. 20. Source terminal Voltage Vs of the drive transistor is determined by the magnitude of the threshold voltage of the drive transistor (minimum value Vthmin to maximum value Vthmax of the threshold value), as illustrated in FIG. 20, so that, when the threshold voltage is shifted by the gate voltage stress, accurate detection and normal correction of the threshold voltage will become impossible and the quality of a displayed image will be degraded. In FIG. 20, VB denotes the fixed voltage applied to the gate terminal of the drive transistor, and ΔVth denotes the magnitude of the variation in the threshold voltage of the drive transistor.

Consequently, Japanese Unexamined Patent Publication No. 2006-227237 (Patent Document 4) proposes a method for preventing a threshold voltage shift of the drive transistor by applying voltage Vg lower than source voltage Vs of the drive transistor to the gate terminal to apply a reverse bias to the drive transistor immediately before a reset period in which data held in the pixel circuit is reset.

The magnitude of gate voltage Vg applied to the gate terminal of the drive transistor when displaying an image depends on the image, and the amount of shift in the threshold voltage of the drive transistor varies with the magnitude of gate voltage Vg. In contrast, the reverse bias period and magnitude of reverse bias voltage in Patent Document 4 are common to all pixels, so that the method can not handle the deviation in threshold voltage of drive transistors and the variation in shift amount of threshold voltages arising from the displayed image. Then, once the shift in the threshold voltage of the drive transistor has started out due to insufficiency of reverse bias, the threshold voltage will shift at an accelerated pace. That is, for the method described in Patent Document 4, it is difficult to prevent the threshold voltage shift of the drive transistor in a case in which the displayed image is updated over a long period of time.

In view of the circumstances described above, it is an object of the present invention to provide a display apparatus capable of preventing threshold voltage shifts of drive transistors and stably correcting threshold voltage variations of the drive transistors over a long period of time.

SUMMARY OF THE INVENTION

A first display apparatus of the present invention is an apparatus, including:

an active matrix substrate on which multiple pixel circuits are disposed, each having a light emitting element, a drive transistor with a source terminal connected to an anode terminal of the light emitting element to apply a drive current to the light emitting element, a capacitor element connected between a gate terminal and the source terminal of the drive transistor, and a selection transistor connected between the gate terminal of the drive transistor and a data line through which a predetermined data signal flows;

a control unit that corrects a threshold voltage of the drive transistor by supplying a predetermined voltage to the gate terminal of the drive transistor to cause a current to flow through the drive transistor and charging a capacitive load connected to the source terminal of the drive transistor with the current, thereby causing the capacitor element to hold the threshold voltage of the drive transistor; and a data drive circuit that supplies reverse bias voltages, each having a magnitude corresponding to a preset initial threshold voltage and a drive voltage of the drive transistor, the magnitude of the drive voltage being dependent on the amount of emission of the light emitting element, to the gate terminal of the drive transistor.

A second display apparatus of the present invention is an apparatus, including:

an active matrix substrate on which multiple pixel circuits are disposed, each having a light emitting element, a drive transistor with a source terminal connected to an anode terminal of the light emitting element to apply a drive current to the light emitting element, a capacitor element connected between a gate terminal and the source terminal of the drive transistor, and a selection transistor connected between the gate terminal of the drive transistor and a data line through which a predetermined data signal flows; and a control unit that corrects a threshold voltage of the drive transistor by supplying a predetermined voltage to the gate terminal of the drive transistor to cause a current to flow through the drive transistor and charging a capacitive load connected to the source terminal of the drive transistor with the current, thereby causing the capacitor element to hold the threshold voltage of the drive transistor, wherein:

the drive transistor is an n-type thin film transistor with a threshold voltage Vth of nearly 0; and the apparatus further includes a data drive circuit that supplies reverse bias voltages, each having a magnitude corresponding to a drive voltage of the drive transistor, the magnitude of the drive voltage being dependent on the amount of emission of the light emitting element, to the gate terminal of the drive transistor.

A third display apparatus of the present invention is an apparatus, including an active matrix substrate on which multiple pixel circuits are disposed, each having a light emitting element, a drive transistor with a source terminal connected to an anode terminal of the light emitting element to apply a drive current to the light emitting element, a capacitor element connected between a gate terminal and the source terminal of the drive transistor, and a selection transistor connected between the gate terminal of the drive transistor and a data line through which a predetermined data signal flows, wherein:

the drive transistor is an n-type thin film transistor with a threshold voltage Vth of nearly 0; and the apparatus further includes a data drive circuit that supplies reverse bias voltages, each having a magnitude corresponding to a drive voltage of the drive transistor, the magnitude of the drive voltage being dependent on the amount of emission of the light emitting element, to the gate terminal of the drive transistor.

In the first to third display apparatuses described above, the data drive circuit may be a circuit that performs the following:

setting a limit value for the reverse bias voltages;

comparing a reverse bias voltage to be supplied to the gate terminal of the drive transistor with the limit value;

if the reverse bias voltage is greater than the limit value, subtracting the limit value from the reverse bias voltage to obtain a difference voltage; and sequentially carrying over and adding the difference voltage to a next reverse bias voltage to be supplied to the gate terminal of the drive transistor.

Further, the limit value may have a magnitude corresponding to 15% to 50% of the drive voltage of the drive transistor when the light emitting element is at maximum luminance.

Still Further, the drive transistor may be an n-type thin film transistor of IGZO (InGaZnO).

According to the first display apparatus of the present invention, reverse bias voltages, each having a magnitude corresponding to a preset initial threshold voltage and a drive voltage of the drive transistor, the magnitude of the drive voltage being dependent on the amount of emission of the light emitting element, are supplied to the gate terminal of the drive transistor. This allows a reverse bias voltage according to the magnitude of the gate voltage Vg of the drive transistor to be applied to the gate terminal of the drive transistor, whereby the threshold voltage shift of the drive transistor may be controlled appropriately.

According to the second display apparatus of the present invention, an n-type thin film transistor with a threshold voltage Vth of nearly 0V is used as the drive transistor, and reverse bias voltages, each having a magnitude corresponding to a drive voltage of the drive transistor, the magnitude of the drive voltage being dependent on the amount of emission of the light emitting element, are supplied to the gate terminal of the drive transistor. This eliminates the need to measure an initial threshold voltage used for setting the reverse bias voltage and a structure for holding a preset initial threshold voltage, thereby resulting in cost reduction, in addition to the advantageous effects of the first display apparatus of the present invention.

According to the third display apparatus of the present invention, an n-type thin film transistor with a threshold voltage Vth of nearly 0V is used as the drive transistor, and a reverse bias voltage having a magnitude corresponding to a drive voltage of the drive transistor, the magnitude of the drive voltage being dependent on the amount of emission of the light emitting element, are supplied to the gate terminal of the drive transistor. This eliminates the need to correct the variation in threshold voltage of drive transistors since the drive transistors do not have any deviation in the initial value of threshold voltage. Further, as in the first and second display apparatuses of the present invention, a reverse bias voltage according to the magnitude of the gate voltage Vg of the drive transistor may be supplied to the gate terminal of the drive transistor, whereby the threshold voltage shift of the drive transistor may be controlled appropriately. Still further, the time required for correcting threshold voltages of the drive transistors may be used as the time for applying the reverse bias voltage, whereby the voltage of the reverse bias power source may be decreased and power consumption may be reduced.

In the first to third display apparatuses of the present invention, where a configuration is adopted in which a limit value is set to the reverse bias voltages, then a comparison is made between a reverse bias voltage to be supplied to the gate terminal of the drive transistor and the limit value, if the reverse bias voltage is greater than the limit value, the limit value is subtracted from the reverse bias voltage to obtain a difference voltage, and the difference voltage is sequentially carried over and added to a next reverse bias voltage to be supplied to the gate terminal of the drive transistor, the voltage of the reverse bias power source may be decreased and power consumption may be reduced.

Further, when an n-type thin film transistor of IGZO (InGaZnO) is used as the drive transistor, the reversible threshold voltage shift of the n-type thin film transistor of IGZO may be used. That is, the threshold voltage of the n-type thin film transistor of IGZO may also be shifted by the voltage stress due to the application of gate voltage, but unlike an amorphous silicon thin film transistor, the threshold voltage returns to the initial value by applying zero bias. The utilization of this property allows the threshold voltage to be returned to the initial value while, for example, a black screen is displayed or power is turned OFF, so that the threshold voltage shift may be prevented.

DESCRIPTION OF THE PREFERRED EMBODIMENTS

Hereinafter, an organic EL display device incorporating a first embodiment of the display apparatus of the present invention will be described with reference to the accompanying drawings.

Figure 1:
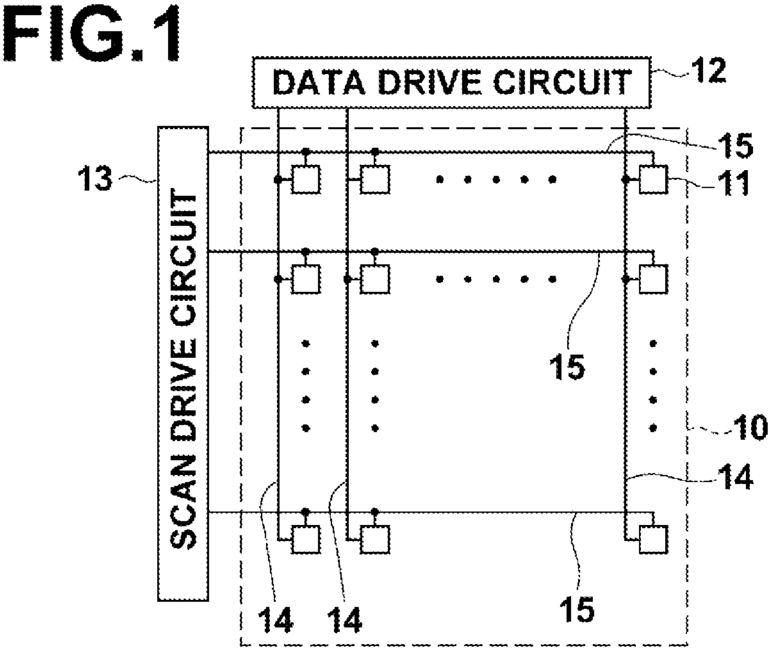
FIG. 1 is a schematic configuration diagram of an organic EL display device incorporating a first embodiment of the display apparatus of the present invention.

As illustrated in FIG. 1, the organic EL display device according to the first embodiment of the present invention includes active matrix substrate 10 having multiple pixel circuits 11 disposed thereon two-dimensionally, each for holding charges according to a data signal outputted from data drive circuit 12 and applying a drive current through an organic EL element according to the amount of charges held therein, data drive circuit 12 that outputs a data signal to each pixel circuit 11 of the active matrix substrate 10, and scan drive circuit 13 that outputs a scan signal to each pixel circuit 11 of the active matrix substrate 10.

Active matrix substrate 10 further includes multiple data lines 14, each for supplying the data signal outputted from data drive circuit 12 to each pixel circuit column and multiple scan lines 15, each for supplying the scan signal outputted from scan drive circuit 13 to each pixel circuit row. Data lines 14 and scan lines 15 are orthogonal to each other, forming a grid pattern. Each pixel circuit 11 is provided adjacent to the intersection between each data line and scan line.

Figure 2:
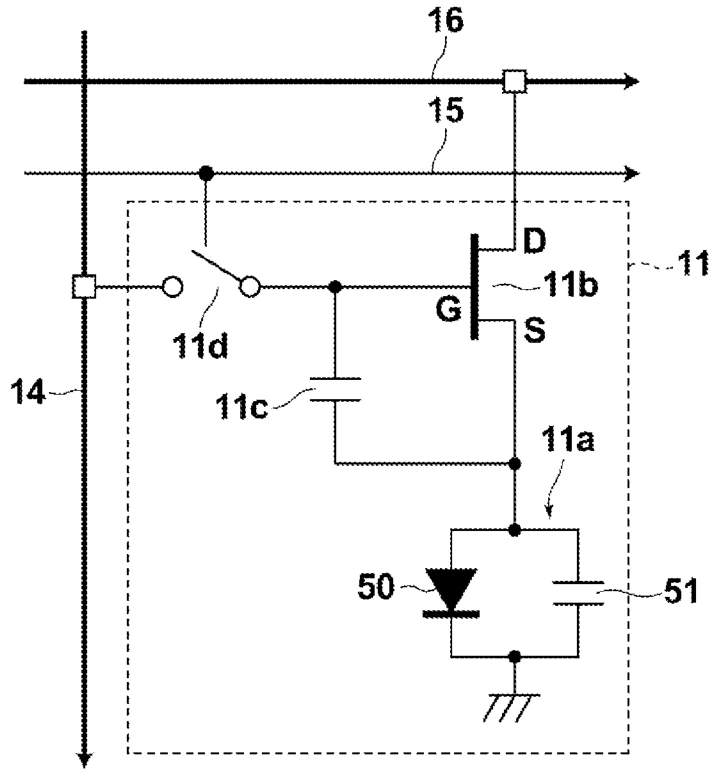
FIG. 2 is a configuration diagram of a pixel circuit of the organic EL display device incorporating the first embodiment of the display apparatus of the present invention.

As illustrated in FIG. 2, pixel circuit 11 includes organic EL element 11*a*, drive transistor 11*b* with its source terminal S connected to the anode terminal of organic EL element 11*a* to apply a drive current and a detection current, to be described later, through organic EL element 11*a*, capacitor element 11*c* connected between gate terminal G and source terminal S of drive transistor 11*b*, and selection transistor 11*d* connected between one end of capacitor element 11*c*/gate terminal G of drive transistor 11*b* and data line 14.

Organic EL element 11*a* includes emission section 50 that emits light according to a drive current applied by drive transistor 11*b* and parasitic capacitance 51 of emission section 50. The cathode terminal of organic EL element 11*a* is connected to the ground potential.

Drive transistor 11*b* and selection transistor 11*d* are n-type thin film transistors. An amorphous silicon thin film transistor or an inorganic oxide thin film transistor may be used as drive transistor 11*b*. As for the inorganic oxide thin film transistor, for example, a thin film transistor of inorganic oxide film made of IGZO (InGaZnO) may be used, but the material is not limited to IGZO and IZO (InZnO) and the like may also be used.

As illustrated in FIG. 2, drain terminal D of drive transistor 11*b* is connected to power line 16. Power line supplies predetermined power source voltage Vddx to drive transistor 11*b*.

Scan drive circuit 13 sequentially outputs ON-scan signal Vscan (on)/OFF-scan signal Vscan(off) to each scan line 15 for turning ON/OFF selection transistor 11*d* of each pixel circuit 11.

Data drive circuit 12 outputs data signals, which include data bus signal VB, reverse bias signal VC, and program data signal Vprg which is dependent on an image to be displayed, to each data line 14. Output timings, functions, magnitude conditions of these data signals will be described in detail later.

Figure 3:
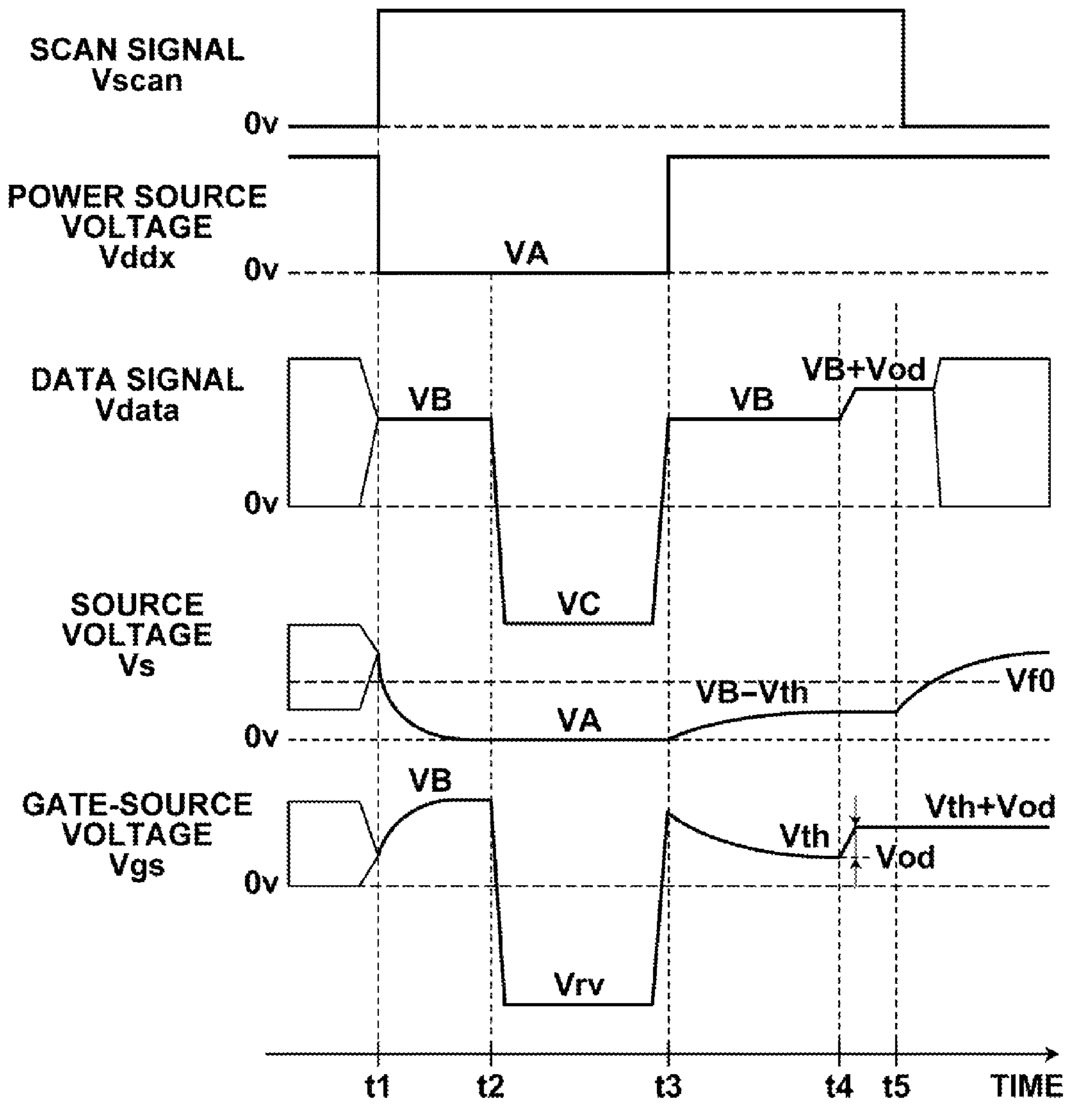
FIG. 3 is a timing chart illustrating an operation of the organic EL display device incorporating the first embodiment of the display apparatus of the present invention.

An operation of organic EL display device of the present embodiment will now be described with reference to the timing chart in FIG. 3 and FIGS. 4 to 8. FIG. 3 depicts voltage waveforms of scan signal Vscan, power source voltage Vddx, data signal Vdata, source voltage Vs, and gate-source voltage Vgs.

In the organic EL display device of the present embodiment, pixel circuit rows connected to respective scan lines 15 of active matrix substrate 10 are sequentially selected and predetermined operations are performed with respect to each pixel circuit row within a selected period. Here, the operations performed in a selected pixel circuit row within a selected period will be described.

First, a certain pixel circuit row is selected by scan drive circuit 13, and an ON-scan signal like that shown in FIG. 3 is outputted to scan line 15 connected to the selected pixel circuit row (time point t1 in FIG. 3).

Figure 4:
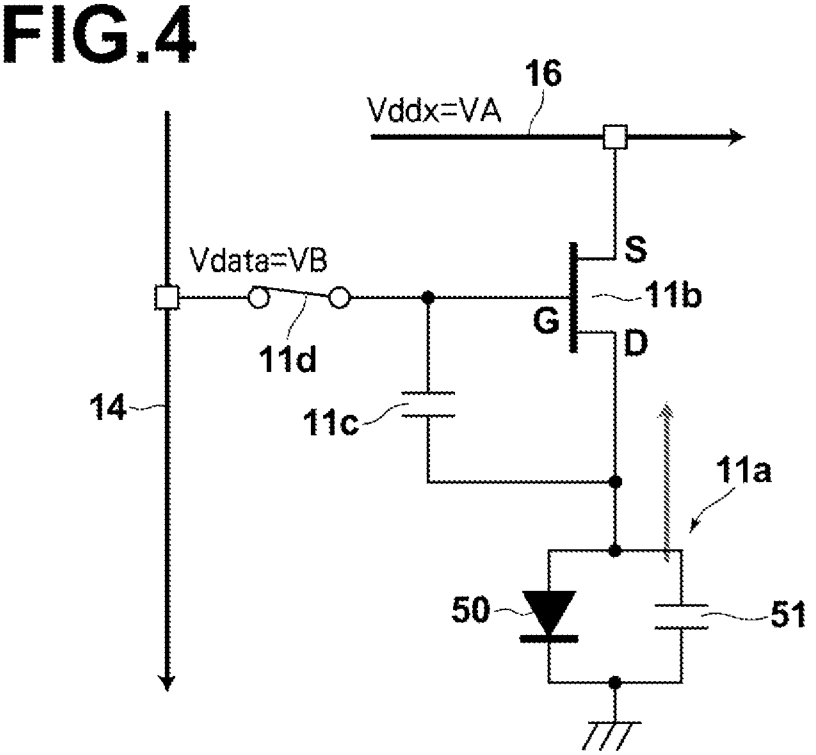
FIG. 4 illustrates a reset operation of the organic EL display device according to the first embodiment.

Then, as illustrated in FIG. 4, selection transistor 11*d* is turned ON in response to the ON-scan signal outputted from scan drive circuit 13, and a short circuit connection is established between gate terminal G of drive transistor 11*b* and data line 14.

Then, a reset operation is performed first (t1 to t2 in FIG. 3 and FIG. 4). More specifically, data bus signal VB is outputted from data drive circuit 12 to each data line 14. Data bus signal VB outputted from data drive circuit 12 is inputted to each pixel circuit 11 of the selected pixel circuit row.

Here, the time immediately preceding the reset operation is an emission period of each pixel circuit 11 of the pixel circuit low, so that a certain amount of charges remains in parasitic capacitance 51 of organic EL element 11*a*. Then, when the power source voltage Vddx of power line 16 changes from Vdd to VA, the terminal of drive transistor 11b on the side of organic EL element 11*a* becomes drain terminal D and the terminal on the side of power line 16 becomes source terminal S, and the charges remaining in parasitic capacitance 51 of organic EL element 11a are discharged to power line 16 via the source-drain of drive transistor 11*b*, whereby the potential of the anode terminal of organic EL element 11*a* eventually becomes VA.

In this way, drive transistor 11*b* is reset in the following manner: gate voltage Vg=VB; source voltage Vs=drain voltage Vd=VA; and gate-source voltage Vgs=VB−VA.

Each of voltages VA and VB needs to satisfy the formulae below, when the emission threshold voltage of organic EL element 11*a* is assumed to be Vf0, the threshold voltage variation of drive transistor 11*b* to be ΔVth, the maximum and minimum threshold voltages of drive transistor 11*b* to be Vthmax and Vthmin respectively.

$$VA<Vf0-\Delta Vth$$

$$VA+Vthmax<VB<Vf0+Vthmin$$

That is, the supply of data bus signal VB causes drive transistor 11*b* to be turned ON but does not cause organic EL element 11*a* to emit light because data bus signal VB is smaller than Vf0+Vthmin.

VA may be set to 0V but, when ΔVth is small, the use of a higher voltage may reduce the emission transition time of organic EL element 11*a*, while if ΔVth is large, it is necessary to set VA to a lower voltage (including a negative voltage).

Figure 5:
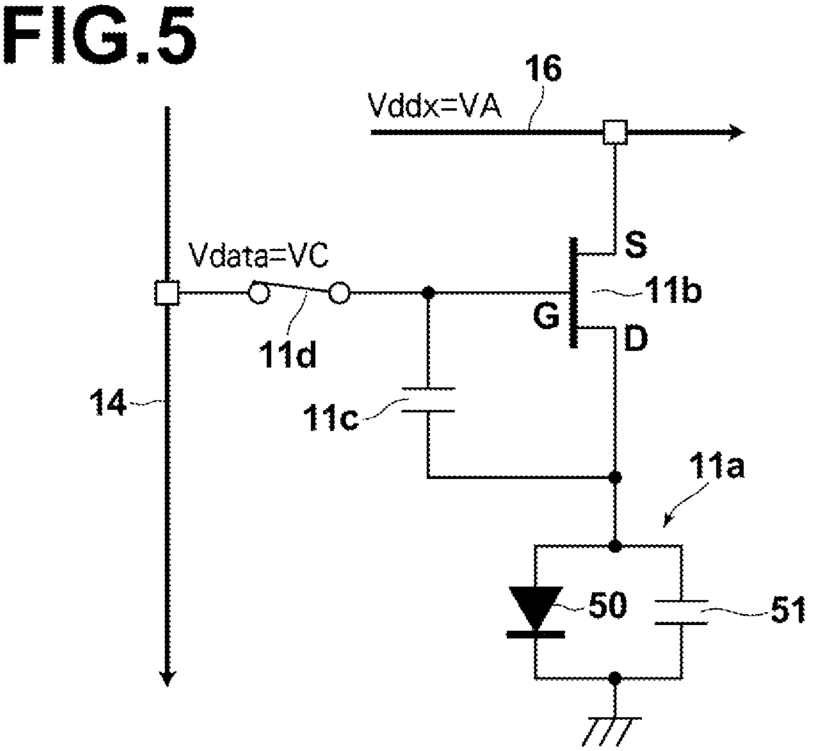
FIG. 5 illustrates a reverse biasing operation of the organic EL display device according to the first embodiment.

Then, a reverse biasing operation is performed (t2 to t3 in FIG. 3 and FIG. 5). After the resetting operation described above, reset signal VC of negative voltage like that shown in FIG. 3 is outputted from data drive circuit 12 to each data line 14.

Reset signal VC outputted from data drive circuit 12 is inputted to each pixel circuit 11 of the selected pixel circuit row and reverse bias voltage Vrv is applied between the gate and source of drive transistor 11*b* of each pixel circuit 11.

Here, Vgs that can be updated by a program operation, to be described later, is Vgs=Vth+Vod, and the voltage stress of drive transistor 11*b* due to the display operation (emission operation) is Vgs×Tdsp. Accordingly, if the initial threshold voltage of drive transistor 11*b* is assumed to be Vth0, over drive voltage Vod to be updated is assumed to be Vodx, the display period (emission period, from time point t5 onward in FIG. 3) is assumed to be Tdsp, the voltage stress of drive transistor 11*b* can be approximated as (Vth0+Vodx)×Tdsp.

Consequently, when the reverse bias period is assumed to be Trv (t2 to t3 in FIG. 3), reverse bias voltage Vrv is set to a magnitude that satisfies the formula below.

$$Vrv=Vgs\times Tdsp/Trv=(Vth0+Vodx)\times Tdsp/Trv$$

Application of a reverse bias voltage that satisfies the formula above results in that the average voltage stress during one frame is equalized between positive and negative values and becomes nearly zero.

Here, Vth0 is a predetermined initial threshold voltage of drive transistor 11*b*, which may be a design value common to drive transistor 11*b* of each pixel circuit 11, an actually measured value with respect to a representative drive transistor 11*b* and applied to each drive transistor 11*b*, or an actually measured value for each drive transistor 11*b*. Vodx is an overdrive voltage of drive transistor 11*b*, which is dependent on the amount of emission of organic EL element of each pixel circuit 11.

The reset signal is set to a magnitude that satisfies the formula below.

$$VC=VA-Vrv$$

Where VA=0V, VC becomes a negative voltage, so that data drive circuit 12 is configured to be able to output reset signal VC of such a negative voltage.

While reverse bias voltage Vrv is applied between the gate and source of drive transistor 11*b*, drive current Id=0 since drive transistor 11*b* is in a reverse-biased state, and therefore source voltage Vs of drive transistor 11*b* does not vary from VA.

Figure 6:
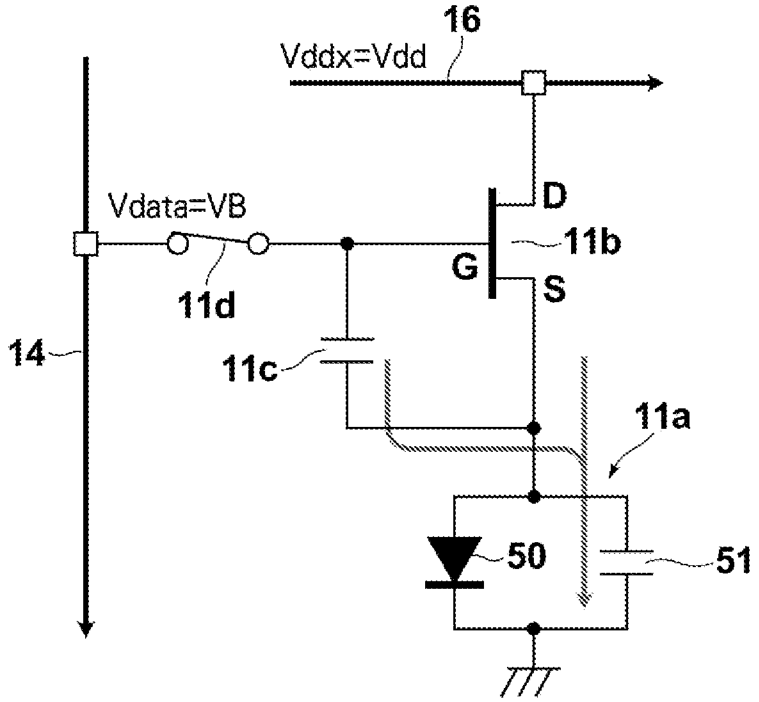
FIG. 6 illustrates a threshold voltage detection operation of the organic EL display device according to the first embodiment.

Then, a threshold voltage detection operation is performed (t3 to t4 in FIG. 3 and FIG. 6). More specifically, power source voltage Vddx of power line 16 is returned to Vdd, which causes the terminal of drive transistor 11*b* on the side of power line 16 to be drain terminal D and the terminal on the side of organic EL element 11*a* to be source terminal S.

Here, data bus signal VB is being supplied to gate terminal G of drive transistor 11*b*, thus Vgs>Vth and detection current Idd flows through drive transistor 11*b* according to Vgs. Then, detection current Idd charges parasitic capacitance 51 of organic EL element 11*a*, and source voltage Vs of source terminal S of drive transistor 11*b* is increased.

Data bus signal VB supplied to gate terminal G of drive transistor 11*b* is a fixed voltage, so that Vgs is decreased by the increase in source voltage Vs and detection current Idd is decreased.

Then, the detection current of drive transistor 11*b* eventually cease to flow at the time point when source voltage Vs=VB−Vth (time point t3 in FIG. 3).

At this time point, terminal voltage Vcs of capacitor element 11*c* is, Vcs=Vg−Vs=VB−(VB−Vth)=Vth, thus, threshold voltage Vth of drive transistor 11*b* is maintained.

Here, in order to keep source voltage Vs below the emission threshold voltage of organic EL element 11*a*, data bus signal VB needs to have a magnitude that satisfies the formula below, as described above.

$$VB=Vf0+Vthmin$$

Figure 7:
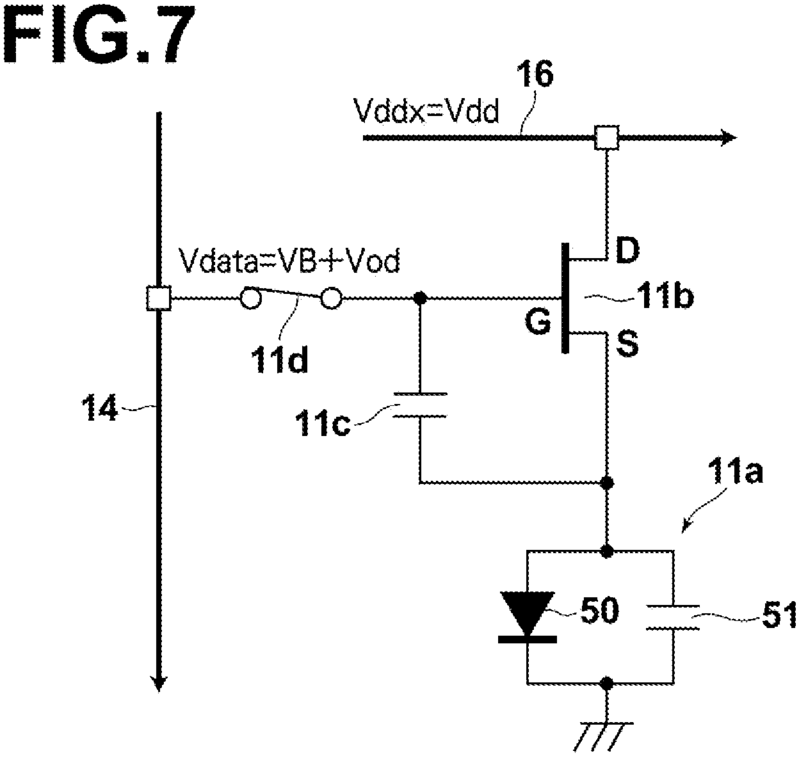
FIG. 7 illustrates a program operation of the organic EL display device according to the first embodiment.

Then, a program operation is performed (t4 to t5 in FIG. 3 and FIG. 7). More specifically, program data signal Vprg is outputted from data drive circuit 12 to each data line 14. Program data signal Vprg outputted from data drive circuit 12 is inputted to each pixel circuit 11 of the selected pixel circuit row.

Here, program data signal Vprg is, Vprg=VB+Vod. Vod is an overdrive voltage of drive transistor 11*b*, which is Vgs−Vth, Vod=Vgs−Vth. Note that Vod is a voltage value signal having a magnitude according to an image to be displayed. That is, a voltage value signal having a magnitude corresponding to a desired amount of emission of organic EL element 11*a*.

When program data signal Vprg that satisfies the formula above, source voltage Vs of drive transistor 11*b* is divided by capacitance Cs of capacitor element 11*c* and capacitance Cd of parasitic capacitance 51 of organic EL element 11*a*, so that Vs=(VB−Vth)+Vod×{Cs/(Cd+Cs)}, but if Cs<<Cd, then Vod×{Cs/(Cd+Cs)≈0, thus, Vs≈VB−Vth. Therefore, a voltage substantially corresponding to threshold voltage Vth detected by the threshold voltage detection operation plus Vod is set to capacitor element 11*c*.

Figure 8:
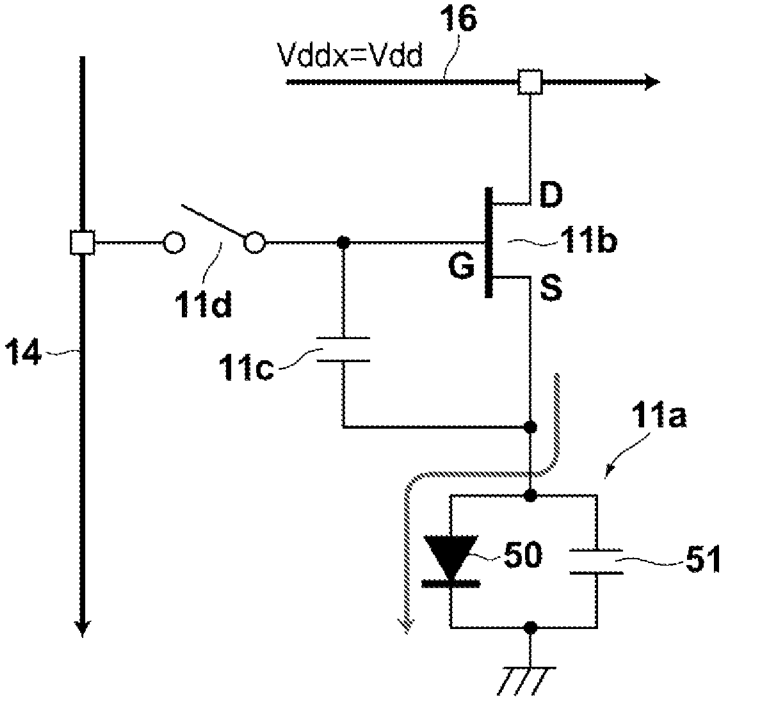
FIG. 8 illustrates an emission operation of the organic EL display device according to the first embodiment.

Then, an emission operation is performed (from time point t5 onward in FIG. 3 and FIG. 8). More specifically, an OFF-scan signal is outputted from scan drive circuit 13 to each scan line 15 (time point t5 in FIG. 3). Then, as illustrated in FIG. 8, selection transistor 11*d* is turned OFF in response to the OFF-scan signal outputted from scan drive circuit 13, and gate terminal G of drive transistor 11*b* is separated from data line 14.

Then, gate-source voltage Vgs of drive transistor 11*b* becomes Vod+Vth, and drive current Idv flows between the drain and source of drive transistor 11*b* according to the TFT current formula below.

$$\begin{aligned} Idv &= \mu \times Cox \times (W/L) \times (Vgs - Vth)^2 \\ &= \mu \times Cox \times (W/L) \times Vod^2 \end{aligned}$$

where, μ is the electron mobility, Cox is the gate oxide film capacitance per unit area, W is the gate width, and L is the gate length.

Parasitic capacitance 51 of organic EL element 11*a* is charged by drive current Idv, and source voltage Vs of drive transistor 11*b* is increased, but gate-source voltage Vgs is maintained at Vod+Vth held by capacitor element 11*c*, so that source voltage Vs exceeds, in due time, emission threshold voltage Vf0 of organic EL element 11*a* and an emission operation under a constant current is performed by emission section 50 of organic EL element 11*a*.

Note that, after application of Vod is completed, it is necessary to turn OFF selection transistor 11*d* by outputting an OFF-scan signal from scan drive circuit 13 to each scan line 15 before source voltage Vs is increased by the increase in the terminal voltage of parasitic capacitance 51 of organic EL element 11*a* by drive current Idv applied between the drain and source of drive transistor 11*b*.

Thereafter, pixel circuit rows are sequentially selected by scan drive circuit 13, and the resetting operation to the emission operation are performed in each pixel circuit row, whereby a desired image is displayed.

The configuration of pixel circuit is not limited to pixel circuit 11 in organic EL display device according to the first embodiment described above, and any configuration may be used as long as it detects the threshold voltage by charging the parasitic capacitance of organic EL element 11*a*.

Figure 9:
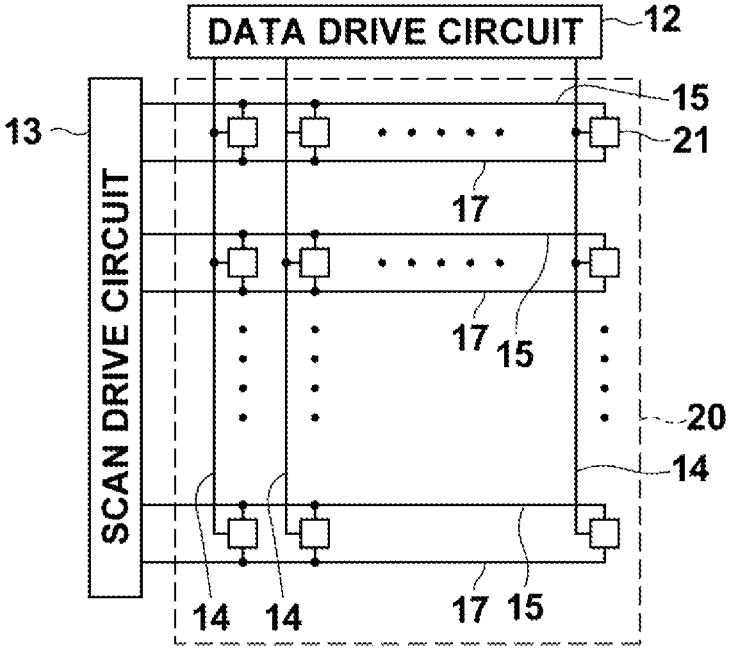
FIG. 9 is a schematic configuration diagram of an organic EL display device incorporating a second embodiment of the display apparatus of the present invention.
Figure 10:
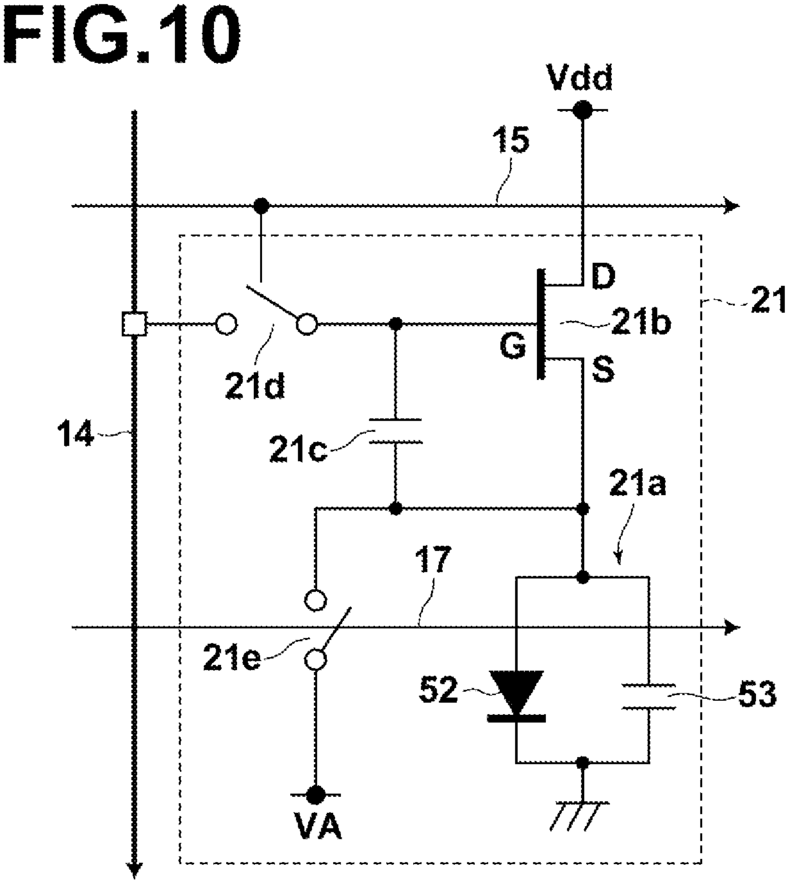
FIG. 10 is a configuration diagram of a pixel circuit of the organic EL display device incorporating the second embodiment of the display apparatus of the present invention.

Next, an organic EL display device incorporating a second embodiment of the display apparatus of the present invention having a pixel circuit of different configuration from that of the pixel circuit of the organic EL element display apparatus according to the first embodiment will be described. FIG. 9 is a schematic configuration diagram of the organic EL display device incorporating the second embodiment of the display apparatus of the present invention. FIG. 10 is a configuration diagram of pixel circuit 21 according to the second embodiment.

As illustrated in FIG. 9, the organic EL display device of the second embodiment further includes multiple reset scan lines 17 for supplying reset signal Vres outputted from scan drive circuit 13 to each pixel circuit row.

As illustrated in FIG. 10, pixel circuit 21 according to the second embodiment includes organic EL element 21*a*, drive transistor 21*b* with its source terminal S connected to the anode terminal of organic EL element 21*a* to apply a drive current through organic EL element 21*a*, capacitor element 21*c* connected between gate terminal G and source terminal S of drive transistor 21*b*, selection transistor 21*d* connected between gate terminal G of drive transistor 21*b* and data line 14, and reset transistor 21*e* connected to the source terminal of drive transistor 21*b*.

Organic EL element 21*a* includes emission section 52 that emits light according to a drive current applied by drive transistor 21*b* and parasitic capacitance 52 of emission section 52. The cathode terminal of organic EL element 21*a* is connected to the ground potential.

Drive transistor 21*b*, selection transistor 11*d*, and reset transistor 21*e* are n-type thin film transistors. As in the first embodiment, an amorphous silicon thin film transistor or an inorganic oxide thin film transistor may be used as drive transistor 21*b*.

As illustrated in FIG. 10, pixel circuit 21 is configured such that fixed voltage Vdd is applied to drain terminal D of drive transistor 21*b* and fixed voltage VA is applied to source terminal S of drive transistor 21*b* via reset transistor 21*e*.

As in the first embodiment, scan drive circuit 13 sequentially outputs ON-scan signal Vscan(on) and OFF-scan signal Vscan(off) to each scan line 15. Further, scan drive circuit 13 sequentially outputs ON-reset signal Vres(on)/ OFF-reset signal Vres(off) for turning ON/OFF reset transistor 21*e* of each pixel circuit 21.

Data drive circuit 12 is identical to that of the first embodiment.

Figure 11:
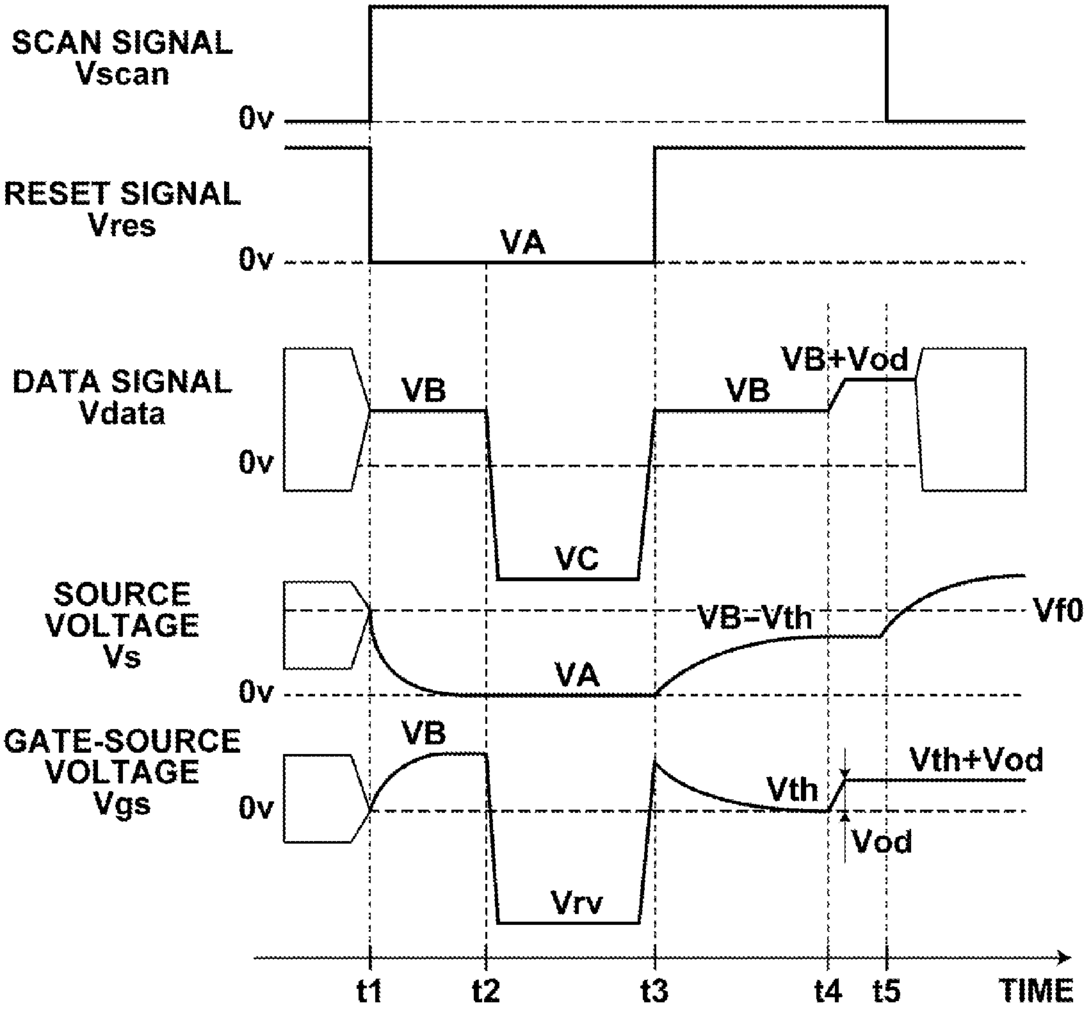
FIG. 11 is a timing chart illustrating an operation of the organic EL display device incorporating the second embodiment of the display apparatus of the present invention.

An operation of organic EL display device of the present embodiment will now be described with reference to the timing chart in FIG. 11 and FIGS. 12 to 15. FIG. 11 depicts voltage waveforms of scan signal Vscan, reset signal Vres, data signal Vdata, source voltage Vs, and gate-source voltage Vgs.

As in the first embodiment, in the second embodiment also, pixel circuit rows connected to respective scan lines 15 of active matrix substrate 10 are sequentially selected and predetermined operations are performed with respect to each pixel circuit row within a selected period. Here, the operations performed in a selected pixel circuit row within a selected period will be described.

First, a certain pixel circuit row is selected by scan drive circuit 13, and an ON-scan signal like that shown in FIG. 11 is outputted to scan line 15 connected to the selected pixel circuit row and an ON-reset signal like that shown in FIG. 11 is outputted to reset scan line 17 connected to the selected pixel circuit row.

Figure 12:
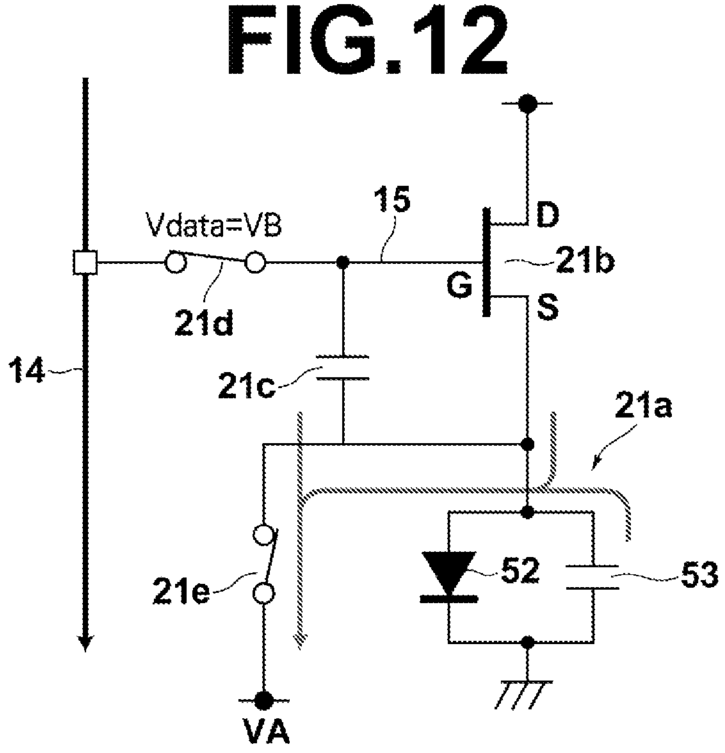
FIG. 12 illustrates a reset operation of the organic EL display device according to the second embodiment.

Then, as illustrated in FIG. 12, selection transistor 21*d* is turned ON in response to the ON-scan signal outputted from scan drive circuit 13, whereby a short circuit connection is established between gate terminal G of drive transistor 21*b* and data line 14, and reset transistor 21*e* is turned ON in response to the ON-reset signal outputted from scan drive circuit 13, whereby a short circuit connection is established between source terminal S of drive transistor 21*b* and the fixed voltage source, and fixed voltage VA is supplied to source terminal S of the drive transistor 21*b*.

Then, a reset operation is performed first (t1 to t2 in FIG. 11 and FIG. 12). More specifically, data bus signal VB is outputted from data drive circuit 12 to each data line 14. This causes gate voltage Vg of drive transistor 21*b* to be set to VB, that is Vg=VB, and source voltage Vs of drive transistor 21*b* to be set to VA, that is Vs=VA, thus gate-source voltage Vgs of drive transistor 21*b* is set to VB−VA, that is Vgs=VB−VA.

Here, data bus signal VB needs to satisfy the formula below. That is, data bus signal VB needs to satisfy the condition for causing a certain amount of drive current Id to flow through drive transistor 21*b* to the side of the voltage source that supplies fixed voltage VA.

$$VB>VA+Vthmax$$

where, Vthmax is the maximum threshold voltage of drive transistor 21*b*.

Fixed voltage VA needs to satisfy the condition, VA<Vf0−ΔVth (where, Vf0 is the emission threshold voltage of organic EL element 21*a* and ΔVth is the magnitude of the threshold voltage variation of drive transistor 21*b*), thus generally VA=0V does not cause any problem. But, the use of a higher voltage may reduce the emission transition time of organic EL element 21*a*, while if ΔVth is large, it is necessary to set VA to a lower voltage (including a negative voltage).

Then, by setting gate-source voltage Vgs of drive transistor 21*b* to VB−VA, that is Vgs=VB−VA, in the manner as described above, charges remaining in parasitic capacitance 53 of organic EL element 21*a* are discharged to the fixed voltage source via reset transistor 21*e*, whereby the potential of the anode terminal of organic EL element 21*a* eventually becomes 0V.

Figure 13:
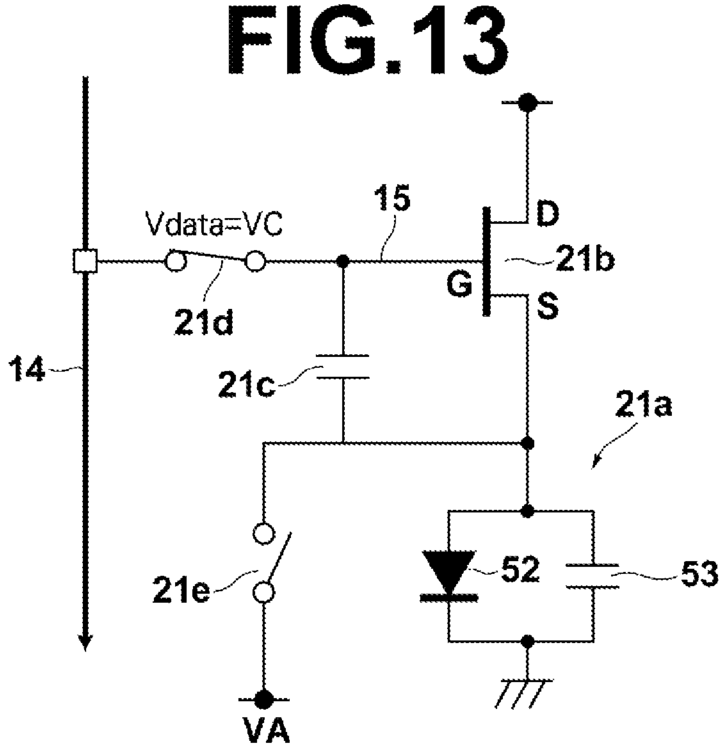
FIG. 13 illustrates a reverse biasing operation of the organic EL display device according to the second embodiment.
Figure 14:
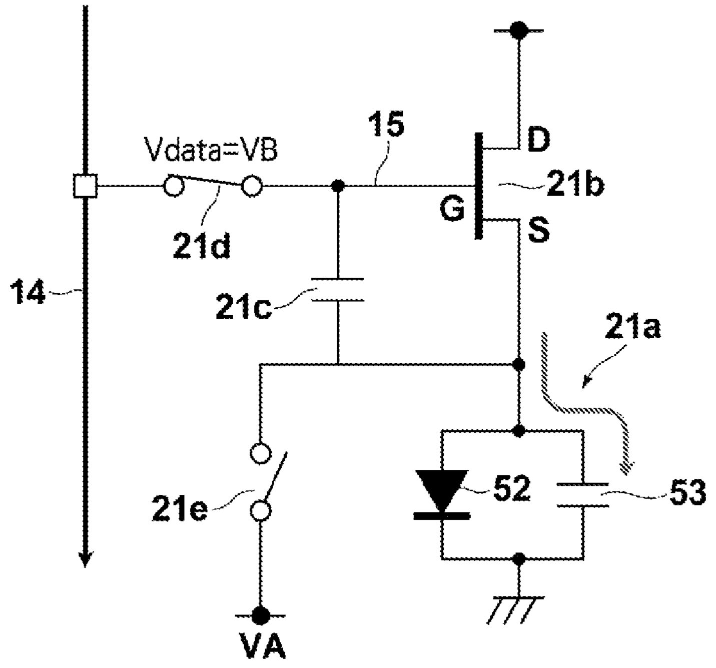
FIG. 14 illustrates a threshold voltage detection operation of the organic EL display device according to the second embodiment.

Then, a reverse biasing operation is performed (t2 to t3 in FIG. 11 and FIG. 13). After the resetting operation described above, reset signal VC of negative voltage like that shown in FIG. 11 is outputted from data drive circuit 12 to each data line 14.

Reset signal VC outputted from data drive circuit 12 is inputted to each pixel circuit 21 of the selected pixel circuit row, and reverse bias voltage Vrv is applied between the gate and source of drive transistor 21*b* of each pixel circuit 21. The methods for setting reset signal VC and reverse bias voltage Vrv are identical to those in the first embodiment.

Application of reverse bias voltage Vrv results in that the average voltage stress during one frame is equalized between positive and negative values and becomes nearly zero.

Then, a threshold voltage detection operation is performed (t3 to t4 in FIG. 11 and FIG. 13). More specifically, an OFF-reset signal like that shown in FIG. 11 is outputted from scan drive circuit 13 to reset scan line 17.

Then, as illustrated in FIG. 13, reset transistor 21*e* is turned OFF in response to the OFF-reset signal outputted from scan drive circuit 13, and source terminal S of drive transistor 21*b* is separated from the fixed voltage source.

This causes gate-source voltage Vgs of drive transistor 21*b* to become VB>Vth, that is Vgs=VB>Vth, and detection current Idd flows through drive transistor 21*b* according to Vgs. Then, detection current Idd charges parasitic capacitance 53 of organic EL element 21*a*, and source voltage Vs of source terminal S of drive transistor 11*b* is increased.

Data bus signal VB supplied to gate terminal G of drive transistor 21*b* is a fixed voltage, so that Vgs is decreased by the increase in source voltage Vs and detection current Idd is decreased.

Then, the detection current of drive transistor 21*b* eventually ceases to flow at the time point when source voltage Vs=VB−Vth (time point t4 in FIG. 11).

At this time point, terminal voltage Vcs of capacitor element 21*c* is, Vcs=Vg−Vs=VB−(VB−Vth)=Vth, thus, threshold voltage Vth of drive transistor 21*b* is maintained.

Here, in order to keep source voltage Vs below the emission threshold voltage of organic EL element 21*a*, data bus signal VB needs to have a magnitude that satisfies the formula below. Vthmin in the formula is the minimum threshold voltage of drive transistor 21*b*.

$$VB<Vf0+Vthmin$$

Figure 15:
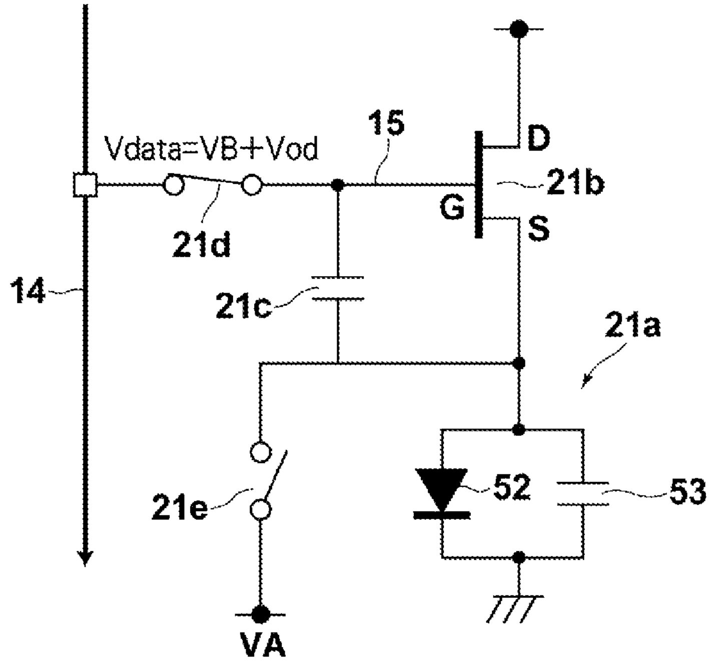
FIG. 15 illustrates a program operation of the organic EL display device according to the second embodiment.

Then, a program operation is performed (t4 to t5 in FIG. 11 and FIG. 15). More specifically, program data signal Vprg is outputted from data drive circuit 12 to each data line 14. Program data signal Vprg outputted from data drive circuit 12 is inputted to each pixel circuit 21 of the selected pixel circuit row.

Here, program data signal Vprg is VB+Vod, that is Vprg=VB+Vod. Vod is an overdrive voltage of drive transistor 21*b*, which is Vgs−Vth, that is Vod=Vgs−Vth. Note that Vod is a voltage value signal having a magnitude according to an image to be displayed. That is, a voltage value signal having a magnitude corresponding to a desired amount of emission of organic EL element 21*a*.

When program data signal Vprg that satisfies the formula above, source voltage Vs of drive transistor 21*b* is divided by capacitance Cs of capacitor element 21*c* and capacitance Cd of parasitic capacitance 53 of organic EL element 21*a*, so that Vs=(VB−Vth)+Vod×{Cs/(Cd+Cs)}, but if Cs<<Cd, then Vod×{Cs/(Cd+Cs)≈0, thus, Vs≈VB−Vth. Therefore, a voltage substantially corresponding to threshold voltage Vth detected by the threshold voltage detection operation plus Vod is set to capacitor element 21*c*.

Figure 16:
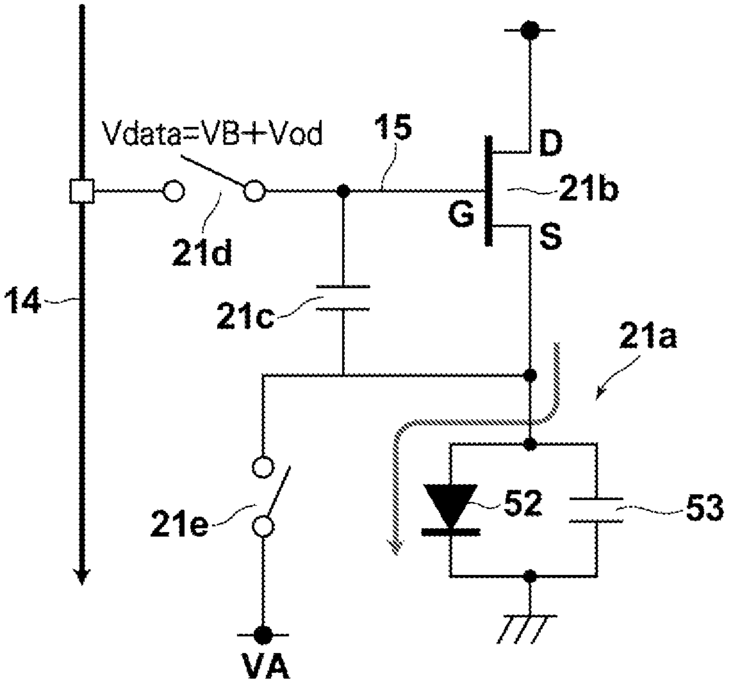
FIG. 16 illustrates an emission operation of the organic EL display device according to the second embodiment.

Then, an emission operation is performed (from time point t5 onward in FIG. 11 and FIG. 16). More specifically, an OFF-scan signal is outputted from scan drive circuit 13 to each scan line 15 (time point t5 in FIG. 11).

Then, as illustrated in FIG. 16, selection transistor 21*d* is turned OFF in response to the OFF-scan signal outputted from scan drive circuit 13, and gate terminal G of drive transistor 21*b* is separated from data line 14.

Then, gate-source voltage Vgs of drive transistor 21*b* becomes Vod+Vth, and drive current Idv flows between the drain and source of drive transistor 21*b* according to the TFT current formula below.

$$\begin{aligned} Idv &= \mu\times Cox\times(W/L)\times(Vgs-Vth)^2 \\ &= \mu\times Cox\times(W/L)\times Vod^2 \end{aligned}$$

where, μ is the electron mobility, Cox is the gate oxide film capacitance per unit area, W is the gate width, and L is the gate length.

Parasitic capacitance 53 of organic EL element 21*a* is charged by drive current Idv, and source voltage Vs of drive transistor 21*b* is increased, but gate-source voltage Vgs is maintained at Vod+Vth held by capacitor element 21*c*, so that source voltage Vs exceeds, in due time, emission threshold voltage Vf0 of organic EL element 21*a* and an emission operation under a constant current is performed by emission section 52 of organic EL element 21*a*.

Note that, after application of Vod is completed, it is necessary to turn OFF selection transistor 21*d* by outputting an OFF-scan signal from scan drive circuit 13 to each scan line 15 before source voltage Vs is increased by the increase in the terminal voltage of parasitic capacitance 52 of organic EL element 21*a* by drive current Idv applied between the drain and source of drive transistor 21*b*.

Thereafter, pixel circuit rows are sequentially selected by scan drive circuit 13, and the resetting operation to the emission operation are performed in each pixel circuit row, whereby a desired image is displayed.

In the organic EL display device of the first or second embodiment, a reverser bias voltage according to an initial threshold voltage and an overdrive voltage of a drive transistor is applied to the drive transistor. If an actually measured threshold value is used as the initial threshold voltage, it is necessary to perform measurements. Even if an actually measured threshold value is not used, a configuration for storing a preset initial threshold value is required, thereby resulting in a cost increase.

Consequently, it is preferable to use an n-type thin film transistor with a threshold voltage Vth of nearly 0V as the drive transistor. The use of an n-type thin film transistor with a threshold voltage Vth of nearly 0V eliminates the need to store the initial threshold voltage, thereby resulting in a cost reduction.

Figure 17:
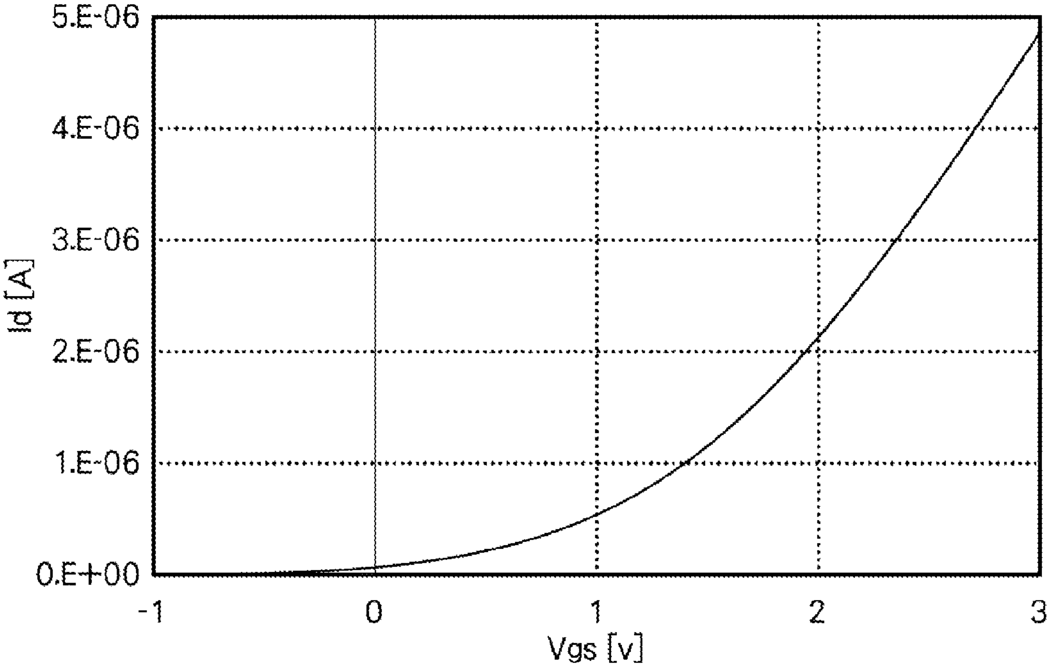
FIG. 17 illustrates an example of current characteristics of a drive transistor with a threshold voltage Vth of nearly 0V.

FIG. 17 illustrates an example of current characteristics of a drive transistor with a threshold voltage Vth of nearly 0V.

Here, for example, the threshold voltage detection method through diode connection described in Patent Document 2 can not use a thin film transistor with a threshold voltage Vth of nearly 0V. In contrast, the threshold voltage detection method of self charging to the parasitic capacitance of an organic EL element, as in the present embodiment described above, may use a thin film transistor with a threshold voltage Vth of nearly 0V, which is best for the threshold voltage correction method of the present embodiment.

Since the threshold voltage Vth of the drive transistor is nearly 0V, gate-source voltage Vgs set by the program operation described above substantially corresponds to overdrive voltage Vodx.

The voltage stress of the drive transistor due to display operation (emission operation) is Vodx×Tdsp, and if the reverse bias period is Trv, reverser bias voltage Vrv is expressed as, $$Vrv = Vodx \times Tdsp / Trv.$$

Application of a reverser bias voltage that satisfies the formula above results in that the average voltage stress during one frame is equalized between positive and negative values and becomes nearly zero.

Note that when an n-type thin film transistor with a threshold voltage Vth of nearly 0V is used as the drive transistor, the other configurations and operations of the display apparatus are identical to those of the organic EL display device of the first or second embodiment.

The term "with threshold voltage Vth of nearly 0V" as used herein refers to that the threshold voltage is substantially small in comparison with Vodx, i.e., Vth<<Vodx, and, for example, refers to that |Vth|<Vod/10.

Now, the reverse bias voltage in organic El apparatus according to the first or second embodiment will be discussed. Reverse bias period Trv during which the reverse bias voltage is applied is a part of program period Tprg, which is naturally far shorter than display period Tdsp. For example, for a QQVGA display with 160×120 pixels, the ratio between program period Tprg and display time Tdsp is, $$Tprg:Tdsp = 1:120.$$

Therefore, even if Trv=Tprg/2, the reverse bias voltage is calculated in the following manner by the formula above.

$$Vrv = 240 \times Vodx$$

Accordingly, even when Vod of the organic EL element at the maximum drive current is assumed to be 1V, the reverse bias voltage is as high as 240V.

Consequently, in the organic EL display device according to the first or second embodiment, a limit value may be set to the reverse bias voltage and the reverse bias voltage may be controlled such that an excess voltage exceeding the limit value is sequentially carried over to the next frame onward. This may decrease the reverse bias voltage to a lower value and power consumption of the display apparatus may be reduced.

Here, it is widely known that the average luminance of a natural image generally becomes about 20% gray.

Consequently, in terms of a long term average, reverse bias voltage Vrv may be calculated in the following manner and is feasible.

$$Vrv = 240 \times Vodx \times 0.2 = 48V$$

For example, if the limit value of the reverse bias voltage is set to 48V, the pixel circuit that programs overdrive voltage Vod corresponding to the maximum drive current of an organic EL element will have a shortage in the reverse bias of 240−48V=192V.

Figure 18:
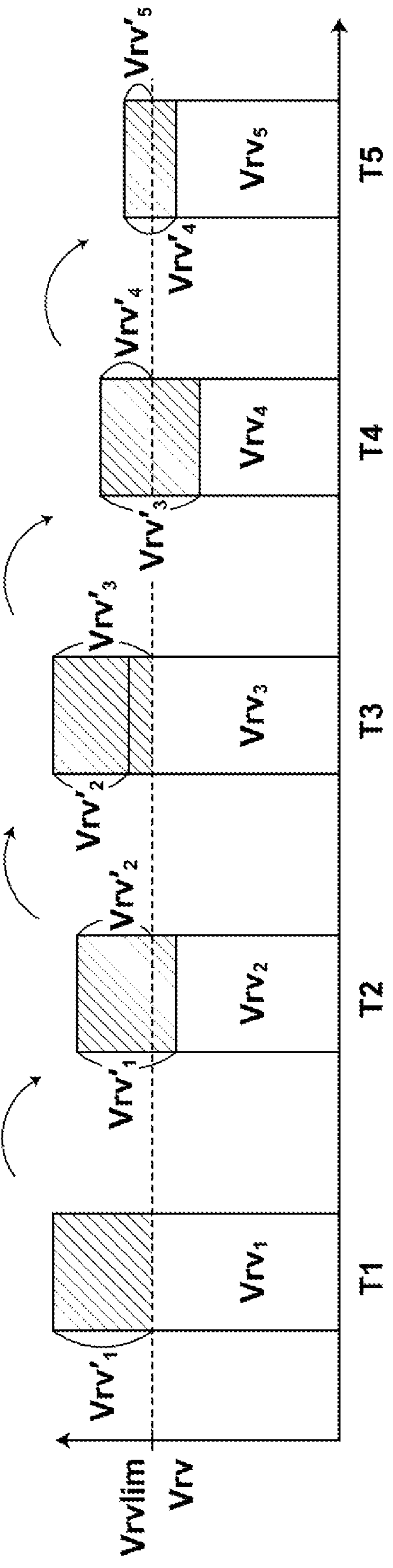
FIG. 18 illustrates a carry over addition of reverse bias voltage.

Accordingly, the shortage of the reverse bias voltage is carried over and added to the reverse bias voltage of the next frame. An operation of the carry-over addition is schematically illustrated in FIG. 18. In FIG. 18, T1 to T5 represent frames, and the limit value of reverse bias voltage is set to Vrvlim.

As illustrated in FIG. 18, when a reverse bias voltage required in first frame T1 is $Vrv_1$, $Vrv_1$ exceeds limit value Vrvlim, so that difference $Vrv_1'$ between them is calculated and a voltage of the same magnitude as limit value Vrvlim is applied in first frame T1 as the reverse bias voltage.

Then, difference $Vrv_1'$ calculated in the manner as described above is carried over and added in the next frame, second frame T2. That is, $Vrv_1'$ is added to reverse bias voltage $Vrv_2$ required in second frame T2. Then, the total value is compared with limit value Vrvlim. If the total value is greater than limit value Vrvlim, difference $Vrv_2'$ between them is calculated and a voltage of the same magnitude as limit value Vrvlim is applied in second frame T2 as the reverse bias voltage. Then, difference $Vrv_2'$ calculated in the manner as described above is carried over and added in the next frame, third frame T3. If the total value of $Vrv_2$ and $Vrv_1'$ is smaller than Vrvlim, the total value is applied as the reverse bias voltage.

Next, $Vrv_2'$ is added to reverse bias voltage $Vrv_3$ required in third frame T3. Then, the total value is compared with limit value Vrvlim. If the total value is greater than limit value Vrvlim, difference $Vrv_3'$ between them is calculated and a voltage of the same magnitude as limit value Vrvlim is applied in third frame T2 as the reverse bias voltage. Then, difference $Vrv_3'$ calculated in the manner as described above is carried over and added in the next frame, fourth frame T4. If the total value of $Vrv_3$ and $Vrv_2'$ is smaller than Vrvlim, the total value is applied as the reverse bias voltage.

In this way, the carry-over additions are sequentially performed.

When the limit value of reverse bias voltage is set, for example, to the average value of 48V described above, the carry-over voltage will not eventually remain after going through many frames. Thus, the moderation of reverse bias voltage is achieved, whereby the threshold voltage shift of the drive transistor is controlled appropriately.

The appropriate limit value of reverse bias voltage may be 15% to 50% or about 20% of the overdrive voltage of the drive transistor when the organic EL element is at maximum luminance.

The reason for setting the limit value of reverse bias voltage to 15% to 50% or about 20% of the overdrive voltage of the drive transistor when the organic EL element is at maximum luminance will now be discussed.

Some of the recent display devices have an automatic luminance control function for controlling luminance according to an image to be displayed. For example, paper "Ergonomics Requirements for Flat Panel Displays", p12, Ergonomics Symposium on Flat Panel Displays (FPD) 2008, JEITA (Japan Electronics and Information Technology Industries Association) describes that display luminance control according to average data of an image to be displayed is effective. That is, the overall luminance is increased for images of low average data, such as image 1 (average data=4.35) to image 3 (average data=1.53) and decreased for images of high average data, such as image 9 (average data=92.46).

As the result, it is presumed that the average luminance will be forced to the same level as image 4 (average data=12.19) to image 8 (average data=43.26).

Hence, when the display device has an automatic luminance control function, it is preferable that the limit value of reverse bias voltage is set to 15% to 50% of the overdrive voltage of the drive transistor when the organic EL element is at maximum luminance.

When the display device does not have an automatic luminance control function, it is preferable that the limit value of reverse bias voltage is set to about 20% of the overdrive voltage of the drive transistor when the organic EL element is at maximum luminance, because the average luminance of a general natural image is about 20% as described, for example, in a paper at Fifth Meeting of Energy Saving Standard Subcommittee, Advisory Committee on Natural Resources and Energy.

The organic EL display device of the embodiment described above may use an n-type thin film transistor of amorphous silicon or inorganic oxide film as the drive transistor as describe above, it is particularly preferable to use an n-type thin film transistor of IGZO as the drive transistor.

In the organic EL display device of the first or second embodiment, when the limit value of reverse bias voltage is set and the shortage of the reverse bias voltage is carried over and added in the next frame onward as described above, there may be a concern that, when, for example, an image having a unique gray balance, unlike a natural image, such as PC screen, CG image, or the like, is displayed for a long period of time, the average reverse bias voltage will differ from a predetermined limit value of reverse bias voltage, and the voltage difference sequentially carried over will be increased, whereby appropriate reverse bias control will become infeasible and a threshold voltage shift of the drive transistor will occur.

In such a case, the use of reversible threshold voltage shift of a thin film transistor of IGZO allows the threshold voltage to be returned to the initial value while, for example, a black screen is displayed or power is turned OFF, so that the threshold voltage shift may be prevented.

Further, as a drive transistor of a pixel circuit of the organic EL display device of the first or second embodiment, a thin film transistor of IGZO with a threshold voltage Vth of nearly 0V may be used. The use of such thin film transistors as the drive transistors in the organic EL display device of the first or second embodiment may eliminate the need to perform the threshold voltage detection described above because such drive transistors do not have any deviation in the initial value of threshold voltage. Therefore, the time required for correcting threshold voltages of the drive transistors may be used as the time for applying the reverse bias voltage, whereby the voltage of the reverse bias power source may be decreased and power consumption may be reduced.

Figure 19:
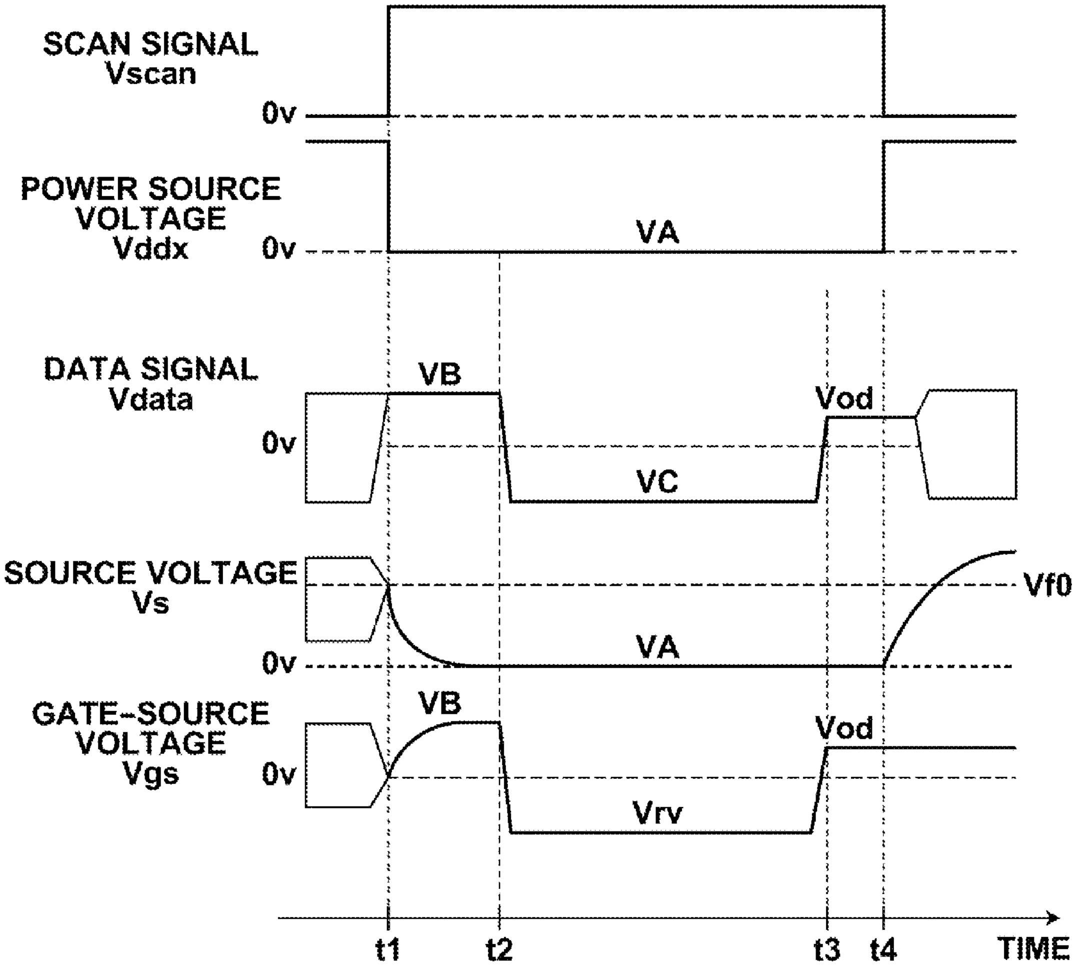
FIG. 19 is a timing chart illustrating an operation of an organic EL display device that uses a thin film transistor of IGZO with a threshold voltage Vth of nearly 0V as a drive transistor.
Figure 20:
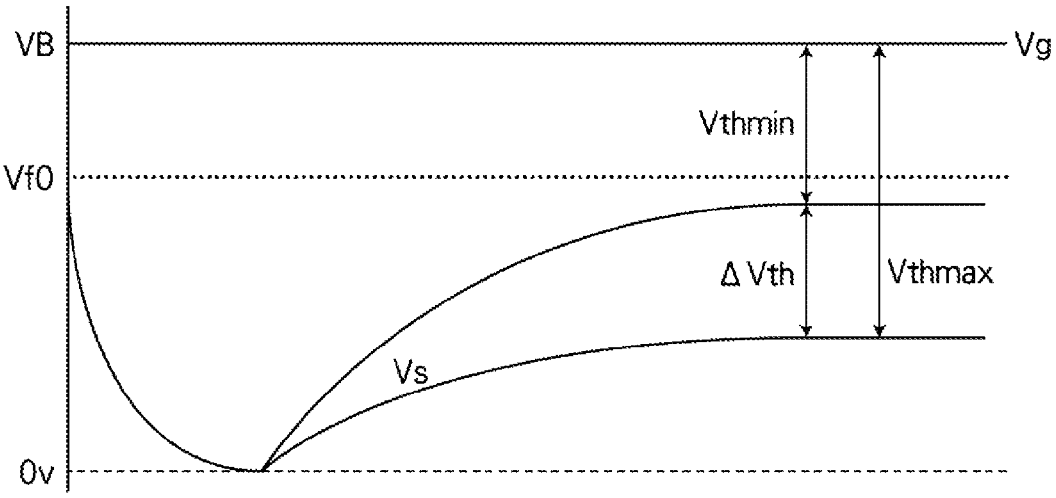
FIG. 20 illustrates the relationship between the source voltage Vs of a drive transistor and the emission threshold voltage of an organic EL element when detecting the threshold voltage of the drive transistor.

FIG. 19 is a timing chart of an organic EL display device which is similar to that of the first embodiment but uses such thin film transistors as described above as the drive transistors. The operation of the apparatus is similar to that of the organic EL display device according to the first embodiment other than not performing the threshold voltage detection operation. Therefore, the timing chart shown in FIG. 19 will be described briefly.

First, a reset operation is performed (t1 to t2 in FIG. 19). More specifically, data bus signal VB is outputted from data drive circuit 12 to each data line 14.

Then, when power source voltage Vddx of power line 16 changes from Vdd to VA, the terminal of drive transistor 11*b* on the side of organic EL element 11*a* becomes drain terminal D and the terminal on the side of power line 16 becomes source terminal S, and the charges remaining in parasitic capacitance 51 of organic EL element 11*a* are discharged to power line 16 via the source-drain of drive transistor 11*b*, whereby the potential of the anode terminal of organic EL element 11*a* eventually becomes VA.

In this way, drive transistor 11*b* is reset in the following manner: gate voltage Vg=VB; source voltage Vs=drain voltage Vd=VA; and gate-source voltage Vgs=VB−VA.

Then, a reverse biasing operation is performed (t2 to t3 in FIG. 19). After the resetting operation described above, reset signal VC of negative voltage like that shown in FIG. 19 is outputted from data drive circuit 12 to each data line 14.

Reset signal VC outputted from data drive circuit 12 is inputted to each pixel circuit 11 of the selected pixel circuit row and reverse bias voltage Vrv is applied between the gate and source of drive transistor 11*b* of each pixel circuit 11. Application of the reverse bias voltage results in that the average voltage stress during one frame is equalized between positive and negative values and becomes nearly zero.

Then, a program operation is performed (t3 to t4 in FIG. 19). More specifically, program data signal Vprg is outputted from data drive circuit 12 to each data line 14. Program data signal Vprg outputted from data drive circuit 12 is inputted to each pixel circuit 11 of the selected pixel circuit row.

Here, program data signal Vprg is VB+Vod, that is Vprg=VB+Vod.

When program data signal Vprg is inputted, the gate voltage of drive transistor 11*b* becomes Vod, and Vod is set to capacitor element 11*c*.

Then, an emission operation is performed (from time point t4 onward in FIG. 19).

More specifically, an OFF-scan signal is outputted from scan drive circuit 13 to each scan line 15 (time point t4 in FIG. 19).

Then, selection transistor 11*d* is turned OFF in response to the OFF-scan signal outputted from scan drive circuit 13, and gate terminal G of drive transistor 11*b* is separated from data line 14.

Then, gate-source voltage Vgs of drive transistor 11*b* becomes Vod, and drive current Idv flows between the drain and source of drive transistor 11*b* according to the TFT current formula below.

$$Idv=\mu\times Cox\times(W/L)\times Vod^2$$

Parasitic capacitance 51 of organic EL element 11*a* is charged by drive current Idv, and source voltage Vs of drive transistor 11*b* is increased, but gate-source voltage Vgs is maintained at Vod held by capacitor element 11*c*, so that source voltage Vs exceeds, in due time, emission threshold voltage Vf0 of organic EL element 11*a* and an emission operation under a constant current is performed by emission section 50 of organic EL element 11*a*. Note that when thin film transistors of IGZO with a threshold voltage Vth of nearly 0V are used as the drive transistors, the limit value of reverse bias voltage may be set and the shortage of the reverse bias voltage may be carried over and added in the next frame onward, as described above.

Further, in the embodiments of the present invention, the threshold voltage of the drive transistor is detected by charging the parasitic capacitance of the organic EL element. The threshold voltage detection method is not limited to this, and a method for detecting the threshold voltage by charging an auxiliary capacitor element connected in parallel with the organic EL element as described, for example, in Japanese Unexamined Patent Publication No. 2008-051990 or a method for detecting the threshold voltage by charging a wiring capacitance of a common power line as described, for example, in U.S. Pat. No. 7,358,941 may be employed.

The embodiments of the present invention described above are embodiments in which the display apparatus of the present invention is applied to an organic EL display device. But, as for the light emitting element, it is not limited to an organic EL element and, for example, an inorganic EL element or the like may also be used.

The display apparatus of the present invention has many applications. For example, it is applicable to handheld terminals (electronic notebooks, mobile computers, cell phones, and the like), video cameras, digital cameras, personal computers, TV sets, and the like.

What is claimed is:

1. A display apparatus, comprising:

an active matrix substrate on which multiple pixel circuits are disposed, each having a light emitting element, a drive transistor with a source terminal connected to an anode terminal of the light emitting element to apply a drive current to the light emitting element, a capacitor element connected between a gate terminal and the source terminal of the drive transistor, and a selection transistor connected between the gate terminal of the drive transistor and a data line through which a predetermined data signal flows;

a control unit that corrects a threshold voltage of the drive transistor by supplying a predetermined voltage to the gate terminal of the drive transistor to cause a current to flow through the drive transistor and charging a capacitive load connected to the source terminal of the drive transistor with the current, thereby causing the capacitor element to hold the threshold voltage of the drive transistor; and a data drive circuit that supplies negative reverse bias voltages, each having a magnitude corresponding to a preset initial threshold voltage and a drive voltage of the drive transistor prior to the threshold voltage being corrected, the magnitude of the drive voltage being dependent on the amount of emission of the light emitting element, to the gate terminal of the drive transistor;

wherein the data drive circuit is a circuit that performs the following:

setting a limit value for the reverse bias voltages;

comparing a reverse bias voltage to be supplied to the gate terminal of the drive transistor with the limit value;

if the reverse bias voltage is greater than the limit value, subtracting the limit value from the reverse bias voltage to obtain a difference voltage; and sequentially carrying over and adding the difference voltage to a next reverse bias voltage to be supplied to the gate terminal of the drive transistor.

2. The display apparatus of claim 1, wherein the limit value has a magnitude corresponding to 15% to 50% of the drive voltage of the drive transistor when the light emitting element is at maximum luminance.

3. The display apparatus of claim 1, wherein the drive transistor is an n-type thin film transistor of IGZO (InGaZnO).

4. The display apparatus of claim 1, wherein the data drive circuit supplies a drive voltage dependent on the amount of emission of the light emitting element to the gate terminal of the drive transistor following correction of the threshold voltage.

5. A display apparatus, comprising:

an active matrix substrate on which multiple pixel circuits are disposed, each having a light emitting element, a drive transistor with a source terminal connected to an anode terminal of the light emitting element to apply a drive current to the light emitting element, a capacitor element connected between a gate terminal and the source terminal of the drive transistor, and a selection transistor connected between the gate terminal of the drive transistor and a data line through which a predetermined data signal flows; and a control unit that corrects a threshold voltage of the drive transistor by supplying a predetermined voltage to the gate terminal of the drive transistor to cause a current to flow through the drive transistor and charging a capacitive load connected to the source terminal of the drive transistor with the current, thereby causing the capacitor element to hold the threshold voltage of the drive transistor, wherein:

the drive transistor is an n-type thin film transistor with a threshold voltage Vth of nearly 0V; and the apparatus further includes a data drive circuit that supplies negative reverse bias voltages, each having a magnitude corresponding to a drive voltage of the drive transistor prior to the threshold value being corrected, the magnitude of the drive voltage being dependent on the amount of emission of the light emitting element, to the gate terminal of the drive transistor;

wherein the data drive circuit is a circuit that performs the following:

setting a limit value for the reverse bias voltages;

comparing a reverse bias voltage to be supplied to the gate terminal of the drive transistor with the limit value;

if the reverse bias voltage is greater than the limit value, subtracting the limit value from the reverse bias voltage to obtain a difference voltage; and sequentially carrying over and adding the difference voltage to a next reverse bias voltage to be supplied to the gate terminal of the drive transistor.

6. The display apparatus of claim 5, wherein the limit value has a magnitude corresponding to 15% to 50% of the drive voltage of the drive transistor when the light emitting element is at maximum luminance.

7. The display apparatus of claim 5, wherein the drive transistor is an n-type thin film transistor of IGZO (InGaZnO).

8. The display apparatus as defined in claim 5, wherein the data drive circuit supplies a drive voltage dependent on the amount of emission of the light emitting element to the gate terminal of the drive transistor following correction of the threshold voltage.

9. A display apparatus, comprising an active matrix substrate on which multiple pixel circuits are disposed, each having a light emitting element, a drive transistor with a source terminal connected to an anode terminal of the light emitting element to apply a drive current to the light emitting element, a capacitor element connected between a gate terminal and the source terminal of the drive transistor, and a selection transistor connected between the gate terminal of the drive transistor and a data line through which a predetermined data signal flows, wherein:

the drive transistor is an n-type thin film transistor with a threshold voltage Vth of nearly 0V; and the apparatus further includes a data drive circuit that supplies negative reverse bias voltages, each having a magnitude corresponding to a drive voltage of the drive transistor prior to the threshold value being corrected, the magnitude of the drive voltage being dependent on the amount of emission of the light emitting element, to the gate terminal of the drive transistor;

wherein the data drive circuit is a circuit that performs the following:

setting a limit value for the reverse bias voltages;

comparing a reverse bias voltage to be supplied to the gate terminal of the drive transistor with the limit value;

if the reverse bias voltage is greater than the limit value, subtracting the limit value from the reverse bias voltage to obtain a difference voltage; and sequentially carrying over and adding the difference voltage to a next reverse bias voltage to be supplied to the gate terminal of the drive transistor.

10. The display apparatus of claim 9, wherein the limit value has a magnitude corresponding to 15% to 50% of the drive voltage of the drive transistor when the light emitting element is at maximum luminance.

11. The display apparatus of claim 9, wherein the drive transistor is an n-type thin film transistor of IGZO (InGaZnO).

12. A display apparatus, comprising:

an active matrix substrate on which multiple pixel circuits are disposed, each having a light emitting element, a drive transistor with a source terminal connected to an anode terminal of the light emitting element to apply a drive current to the light emitting element, a capacitor element connected between a gate terminal and the source terminal of the drive transistor, and a selection transistor connected between the gate terminal of the drive transistor and a data line through which a predetermined data signal flows;

a control unit that corrects a threshold voltage of the drive transistor by supplying a predetermined voltage to the gate terminal of the drive transistor to cause a current to flow through the drive transistor and charging a capacitive load connected to the source terminal of the drive transistor with the current, thereby causing the capacitor element to hold the threshold voltage of the drive transistor; and a data drive circuit that supplies negative reverse bias voltages, each having a magnitude corresponding to a preset initial threshold voltage and a drive voltage of the drive transistor prior to the threshold voltage being corrected, the magnitude of the drive voltage being dependent on the amount of emission of the light emitting element, to the gate terminal of the drive transistor;

wherein the magnitude Vry of the reverse bias voltage is set to satisfy the following formula $$Vrv=(Vth0+Vodx)\cdot Tdsp/Try$$

with respect to an initial threshold voltage Vth0 of the drive transistor, a drive voltage Vodx of the drive transistor dependent on the amount of emission of the light emitting element, a light emission period Tdsp of the light emitting element, and a supply period Try of the reverse bias voltage.

13. A display apparatus, comprising:

an active matrix substrate on which multiple pixel circuits are disposed, each having a light emitting element, a drive transistor with a source terminal connected to an anode terminal of the light emitting element to apply a drive current to the light emitting element, a capacitor element connected between a gate terminal and the source terminal of the drive transistor, and a selection transistor connected between the gate terminal of the drive transistor and a data line through which a predetermined data signal flows; and a control unit that corrects a threshold voltage of the drive transistor by supplying a predetermined voltage to the gate terminal of the drive transistor to cause a current to flow through the drive transistor and charging a capacitive load connected to the source terminal of the drive transistor with the current, thereby causing the capacitor element to hold the threshold voltage of the drive transistor, wherein:

the drive transistor is an n-type thin film transistor with a threshold voltage Vth of nearly 0V: and the apparatus further includes a data drive circuit that supplies negative reverse bias voltages, each having a magnitude corresponding to a drive voltage of the drive transistor prior to the threshold value being corrected, the magnitude of the drive voltage being dependent on the amount of emission of the light emitting element, to the gate terminal of the drive transistor;

wherein the magnitude Vrv of the reverse bias voltage is set to satisfy the following formula $$Vrv=(Vth0+Vodx)\cdot Tdsp/Try$$

with respect to an initial threshold voltage Vth0 of the drive transistor, a drive voltage Vodx of the drive transistor dependent on the amount of emission of the light emitting element, a light emission period Tdsp of the light emitting element, and a supply period Try of the reverse bias voltage.

14. A display apparatus, comprising an active matrix substrate on which multiple pixel circuits are disposed, each having a light emitting element, a drive transistor with a source terminal connected to an anode terminal of the light emitting element to apply a drive current to the light emitting element, a capacitor element connected between a gate terminal and the source terminal of the drive transistor, and a selection transistor connected between the gate terminal of the drive transistor and a data line through which a predetermined data signal flows, wherein:

the drive transistor is an n-type thin film transistor with a threshold voltage Vth of nearly 0V: and the apparatus further includes a data drive circuit that supplies negative reverse bias voltages, each having a magnitude corresponding to a drive voltage of the drive transistor prior to the threshold value being corrected, the magnitude of the drive voltage being dependent on the amount of emission of the light emitting element, to the gate terminal of the drive transistor;

wherein the magnitude Vry of the reverse bias voltage is set to satisfy the following formula $$Vrv=(Vth0+Vodx)\cdot Tdsp/Trv$$

with respect to an initial threshold voltage Vth0 of the drive transistor, a drive voltage Vodx of the drive transistor dependent on the amount of emission of the light emitting element, a light emission period Tdsp of the light emitting element, and a supply period Try of the reverse bias voltage.

* * * * *